June 9, 1936.  E. W. KRONBACH  2,043,252
MOLDING APPARATUS
Filed Oct. 29, 1932  2 Sheets-Sheet 2
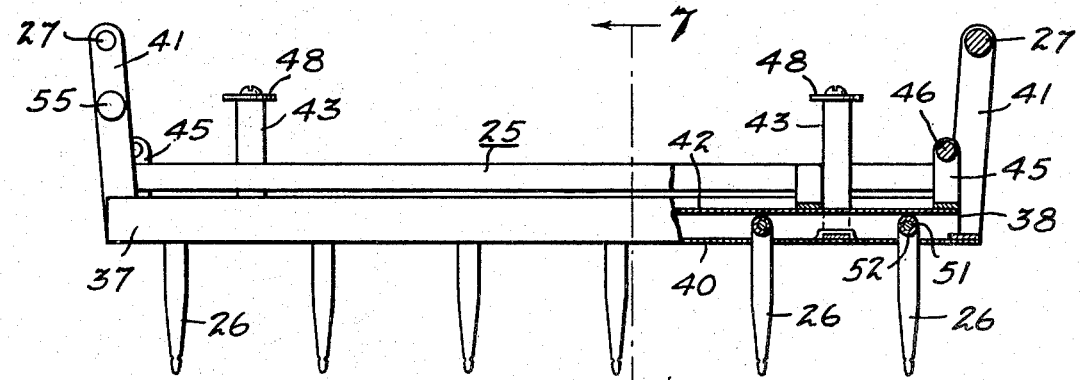
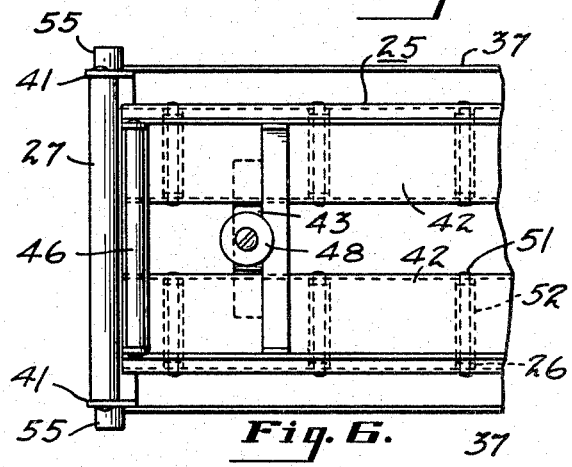
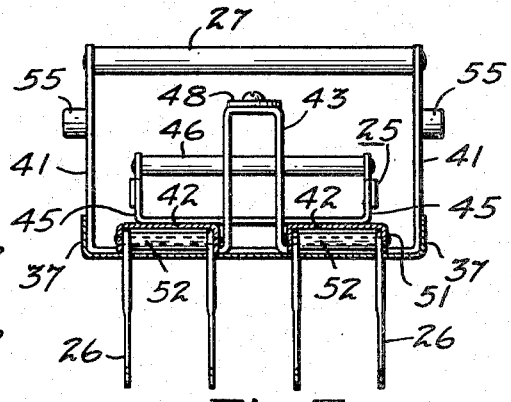
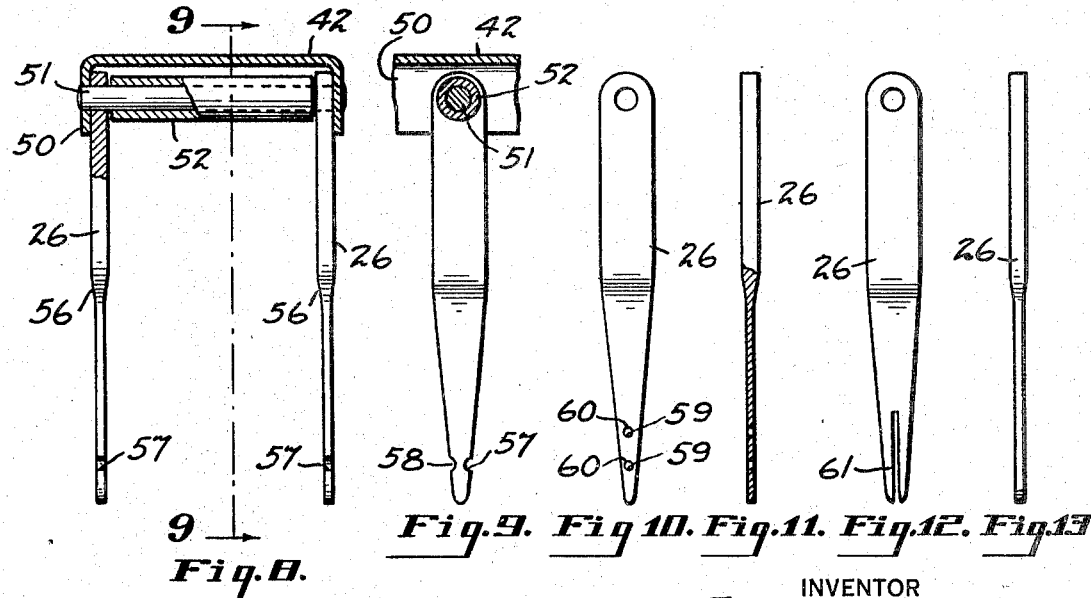
INVENTOR
Edwin W. Kronbach
BY
Warren W. Schmieding
ATTORNEY Patented June 9, 1936

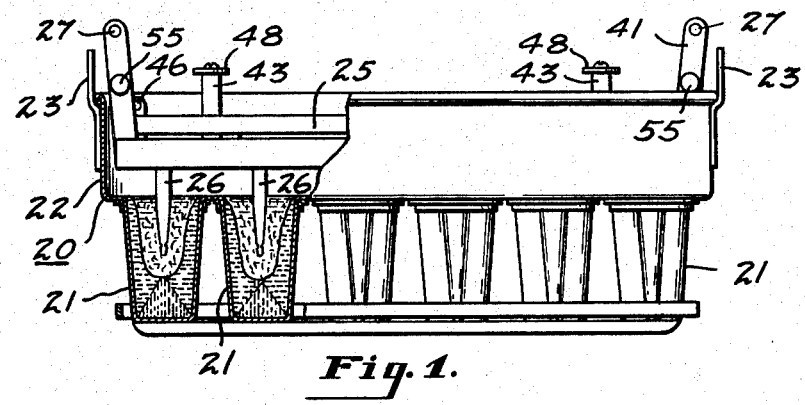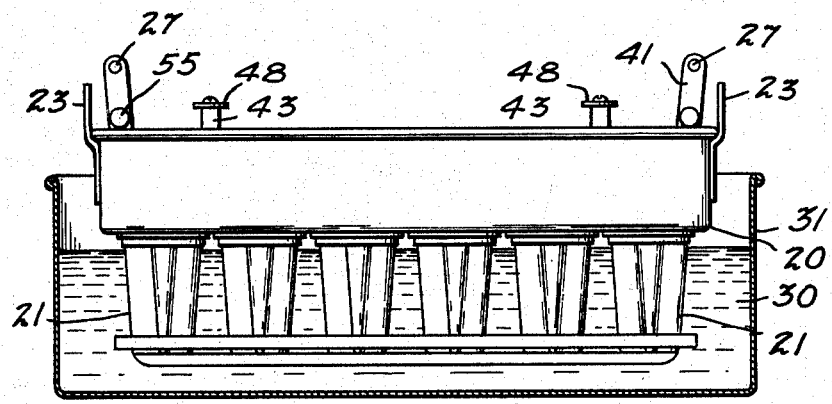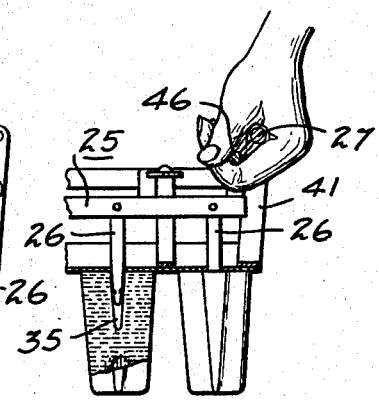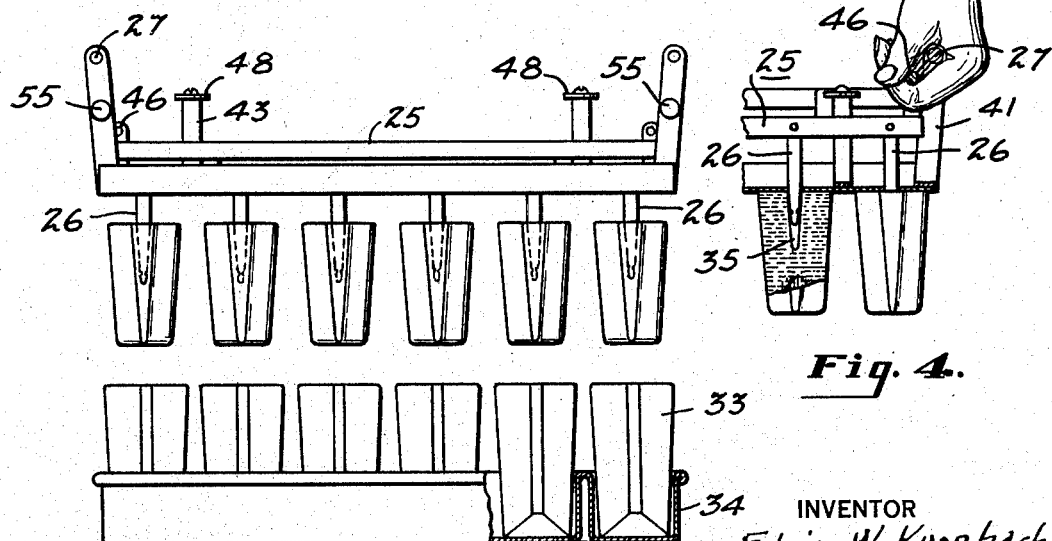

2,043,252

UNITED STATES PATENT OFFICE 2,043,252

MOLDING APPARATUS

Edwin W. Kronbach, Cleveland, Ohio, assignor, by mesne assignments, to Joe Lowe Corporation, a corporation of Delaware Application October 29, 1932, Serial No. 640,220

5 Claims. (Cl. 107—8)

The present invention relates to the art of forming, refrigerating and harvesting frozen bodies such as edible novelties.

One of the objects of the present invention is to provide improved mechanism for withdrawing confections such as ice cream, water ices, sherbets, etc., from the molds in which they are frozen. In carrying out this object, it is the further object to provide a peg which extends into the mold and is frozen to the confection and which is formed to provide sufficient locking engagement with the confection for withdrawing the confection from the mold and so that it can be readily withdrawn from the frozen confection without breaking the confection.

Further objects and advantages will be apparent from the following description, reference being had to the accompanying drawings wherein preferred forms of embodiments are clearly shown.

In the drawings:

Fig. 1 is the side view, partly in section, of a mold and showing a peg assembly applied thereto;

Fig. 2 is a side view of the peg and mold assembly immersed in a defrosting tank;

Fig. 3 is a side view of the peg assembly showing frozen confections attached to the peg and also showing this assembly above a rack containing wrappers or bags;

Fig. 4 is a fragmentary sectional view of the peg assembly showing the confection being removed therefrom;

Fig. 5 is a side view of the peg assembly, partly in section, showing the pegs in their lowermost position;

Fig. 6 is a fragmentary top plan view of the peg assembly;

Fig. 7 is a sectional view taken on line 7—7 of Fig. 5;

Fig. 8 is a fragmentary sectional view looking in the same direction as Fig. 7;

Fig. 9 is a sectional view taken on line 9—9 of Fig. 8;

Fig. 10 is a view showing a modified form of peg;

Fig. 11 is a side view, partly in section, of the peg shown in Fig. 10;

Fig. 12 is a front view of another modified form of peg; and

Fig. 13 is a side view of the peg shown in Fig. 12.

Referring to the drawings in general, there is shown a mold structure 20 including a plurality of individual molds 21 adapted to contain the confection material to be frozen. Molds 21 depend from a receiving container 22, which is provided with handles 23 for manipulating the structure. The mold structure 20 is adapted to receive a peg assembly 25, including pegs 26. Handles 27 are provided for manipulating the peg assembly 25. The molds 20 are subjected to a freezing temperature preferably by immersing the same in a brine solution, and before the confection is solidified, the peg assembly 25 is inserted as shown in Fig. 1 so that the confection freezes to the pegs 26. Preferably the peg assembly 25 is inserted into a mold structure 20 prior to inserting the mold structure into the brine tank. After the confection is frozen the mold structure is withdrawn from the brine tank and the bond between the outer surface of the confection and the individual molds is broken and one manner of carrying this out is to immerse the mold structure in a warm liquid bath as shown in Fig. 2 in which there is provided a tank 30 containing warm liquid 31. Then by lifting the handles 27 of the peg assembly upwardly, the frozen confection will be withdrawn from the molds 21 by the pegs 26.

It may be desirable to add a coating to the confection such as a chocolate coating and this coating may be applied while the frozen confection is bound to the pegs 26. Then after the coating has hardened, the confection is released from the peg and if desirable may be arranged to drop directly into bags 33, carried in spaced relation by a rack 34. Also if desirable a handle stick may be inserted in the hole 35, formed by the peg 26, after the peg is removed.

Referring more in detail to the drawings, in the embodiments shown, my peg assembly includes two main elements; namely, a grid structure indicated generally as 37 and a peg structure indicated generally as 38. The grid structure includes a plate 40 having four rows of aligned slots and in the present instance six slots are provided in each row. Frames are attached to the opposite ends of the plate 40 which frames, including uprights 41, are connected at the top by the handle bar 27 and by which handle the entire peg assembly may be manipulated. The peg structure includes two parallelly disposed inverted U-shaped angle irons 42 spaced from one another whereby the structure may receive posts 43, which posts are attached to the plate 40 of the grid structure. The opposite ends of the peg structure are provided with frames including uprights 45 which are connected at their upper end by a handle bar 46. These frames and the strips 47 tie the angle irons. The strips 47 are arranged to engage washers 48 secured to the posts 43 to limit the upward movement of the peg structure.

The sides 50 of the angle irons 42 receive pins 51 and each pin carries two pegs or spurs 26. These pegs are loosely mounted upon the pins so that they can wobble slightly and are maintaind in operative position by a sleeve 52. Any suitable means may be provided for holding the pins 51 in place.

In order to prevent the peg assembly from being inserted into the mold structure 20 too far, studs 55 are secured to the uprights 41 and are arranged to engage the top of the container 22 to limit the downward movement of the peg assembly. Frost, frozen confection and coating however, tend to cling to the peg above the frozen confection and it is desirable to remove those materials on each operation of the mechanism. In order to accomplish this, the slots in the plate 40 are arranged to snugly embrace the faces of the pegs 26 so as to provide a wiper for the faces. The pegs are often bent out of shape through usage and in order to prevent the pegs from binding in the slots the lower parts of the pegs are made thinner as at 56 and by reason of the loose connection of the peg 26 with the pin 51, the pegs must be bent considerably before they will bind with the walls of the slots even when the pegs are in their uppermost position.

It has been found in general practice that when a peg is used having the same width throughout the length of the part, which is embedded in the frozen confection, the time interval between the time when the confection is not frozen to the pegs sufficiently for permitting the pegs to withdraw the frozen confection from the molds and the time when the frozen confection is bound sufficiently to the pegs so that the pegs can be utilized for withdrawing the frozen confection from the mold, is very short. It has also been found that if refrigeration is applied to the confection to a slight extent and in excess of that necessary to sufficiently bind the peg and confection for the withdrawal of the confection, the confection is frozen to the peg so solidly that it is very difficult to withdraw the peg. In accordance with my invention I have eliminated this difficulty. I have discovered that by tapering the side walls of the peg inwardly as shown in Fig. 9, the peg can be withdrawn more readily. When the confection is solidly frozen to or bound with the peg, the bond between the confection and the peg is not broken at the peg when it is withdrawn but a small amount of confection clings to the peg. The line of breakage is not even throughout the length of the peg and at times greater quantities, in the form of knobs, of confection cling to the lower end of the peg and in withdrawing the peg, this greater quantity must be torn through the confection which in many cases causes injury to the confection, particularly when a coating is applied thereto. By tapering the peg and in withdrawing the same, the cross section of the peg gradually decreases as it approaches the top of the hole formed by the peg so that if knobs of confection cling to the bottom of the peg, the enlarged opening in the top of the confection permits the passage of the knobs.

It is to be understood that the molds 21 and the lower part only of the receiving container 22 are immersed in the refrigerating brine solution. The upper part of the container 22 and the peg assembly 25 are subjected to a somewhat warmer environment. It is apparent therefore that solid freezing or hardening, in the case of ice cream or the like, will first take place in the lower part of the mold and then on the vertical sides, as shown in Fig. 1. The part adjacent the upper end of the pegs will be the last to freeze solidly or harden. Therefore, the binding freezing action between the confection and peg first takes place at the lower part of the peg.

I have discovered that, by providing a cut-away portion or a ledge-like portion at the bottom of the peg, an adequate bond, for withdrawing the confection from the mold by the peg, is provided although the confection is not thoroughly hardened and bonded with the peg throughout the length thereof. Therefore it is not necessary to continue the refrigeration of the confection until it is thoroughly bonded to the peg before attempting to withdraw the same by the peg.

In actual practice the time necessary for freezing the confection to the peg sufficiently for withdrawing the confection from the mold by the peg is determined. In order that the mold may be re-used as quickly as possible, the fixed time for refrigerating is calculated to the time when there is a bond between the peg and confection of sufficient strength for withdrawing the confection by the peg. In view of the fact that the cut-away or ledge-like portions provide such bond long prior to a thorough bond between the confection of peg throughout the entire length of the peg, a large tolerance of time is had between the time when the confection can be withdrawn from the mold and the time when the bond is such that it is difficult to separate the confection from the peg. Therefore, it is apparent that overbonding to such an extent that it will be difficult to remove the confection from the mold, is unlikely. Moreover, in case the mold is permitted to remain in the refrigerating tank longer than necessary, the taper permits the withdrawing without injuring the confection.

The cut-away portions or ledge-like portions of the pins for providing a locking engagement with the confections may be formed in different manners, but obviously they should be formed in such a manner that they will permit the ultimate withdrawal of the pins from the confections without seriously rupturing the openings thereby formed or otherwise spoiling the confections. In Figs. 8 and 9, the ledge-like portions are provided by the bottom walls 57 of recess 58 while in Figs. 10 and 11, the ledge-like portions are provided by the bottom walls 59 of the holes 60. The recesses 58 and holes 60 permit freezing of the confection through the pegs and in addition provide the lifting ledges. If desirable the lower part of the peg may be provided with a slot or slots 61 as shown in Figs. 12 and 13 in which the confection freezes through the peg to thoroughly bind therewith.

While the forms of embodiments of the present invention as herein disclosed constitute preferred forms, it is to be understood that other forms might be adopted, all coming within the scope of the claims which follow.

What I claim is as follows:

1. In a refrigerating device, mechanism for forming frozen confections of the type in which each has an opening, and for withdrawing the confections from the molds in which they are frozen, comprising a grid structure having openings, a peg structure including a plurality of pegs, said pegs extending downwardly through the openings in said grid structure, the lower ends of the pegs adapted to extend into a mold, said lower ends being tapered downwardly and provided with inwardly extending ledge portions for locking the confections to the pegs, said pegs providing means for withdrawing the confections from the molds in which they have been frozen and for forming a cored opening respectively, said structures being movable toward one another for causing engagement of the tops of the confections and the lower side of the grid structure to break the bond between the pegs and confections.

2. In a refrigerating device, the combination with a mold structure including a plurality of individual molds for containing confection material to be frozen, of means for withdrawing the solidified confection material from the molds when frozen comprising a rack having a plurality of fixed pegs mounted thereon and depending therefrom, one of said pegs being adapted to extend into the confection material in each of the individual molds and to be frozen therein, the lower ends of said pegs having ledge portions formed therein to provide locking means between the peg and the frozen confection material, which locking means is within the confines of the peg and permits withdrawal of the peg from the frozen confection without rupturing the opening formed thereby.

3. In a refrigerating device, the combination with a mold structure including a plurality of individual molds for containing confection material to be frozen, of means for withdrawing the solidified confection material from the molds when frozen comprising a rack having a plurality of fixed pegs mounted thereon and depending therefrom, one of said pegs being adapted to extend into the confection material in each mold and to be frozen therein, the lower ends of said pegs being tapered downwardly and being notched to form inwardly extending ledges to provide locking means between the peg and the frozen confection material.

4. In a refrigerating device, the combination with a mold structure including a plurality of individual molds for containing confection material to be frozen, of means for withdrawing the solidified confection material from the molds when frozen comprising a rack having a plurality of fixed pegs mounted thereon and depending therefrom, one of said pegs being adapted to extend into the confection material in each mold and to be frozen therein, the lower ends of said pegs being bifurcated and tapered downwardly to facilitate their removal from the frozen confection material.

5. In a refrigerating device, the combination with a mold structure including a plurality of individual molds for containing confection material to be frozen, of means for withdrawing the solidified confection material from the molds when frozen comprising a rack having a plurality of fixed pegs mounted thereon and depending therefrom, one of said pegs being adapted to extend into the confection material in each mold and to be frozen therein, the lower ends of said pegs being tapered downwardly and being provided with apertures for locking engagement with the frozen confection material.

EDWIN W. KRONBACH.